United States Patent Office 2,710,091
Patented June 7, 1955

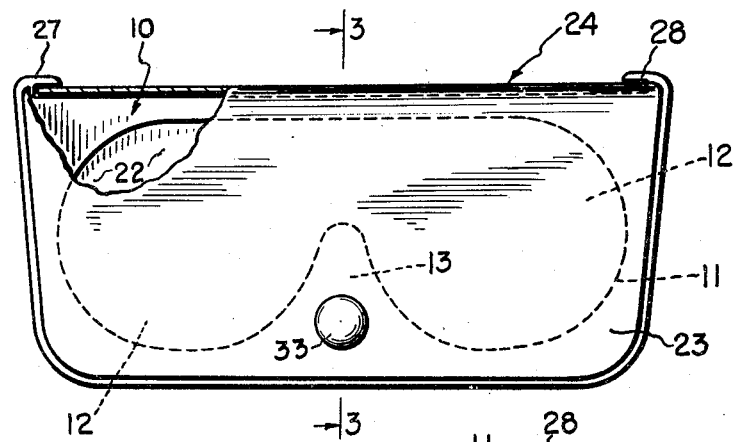
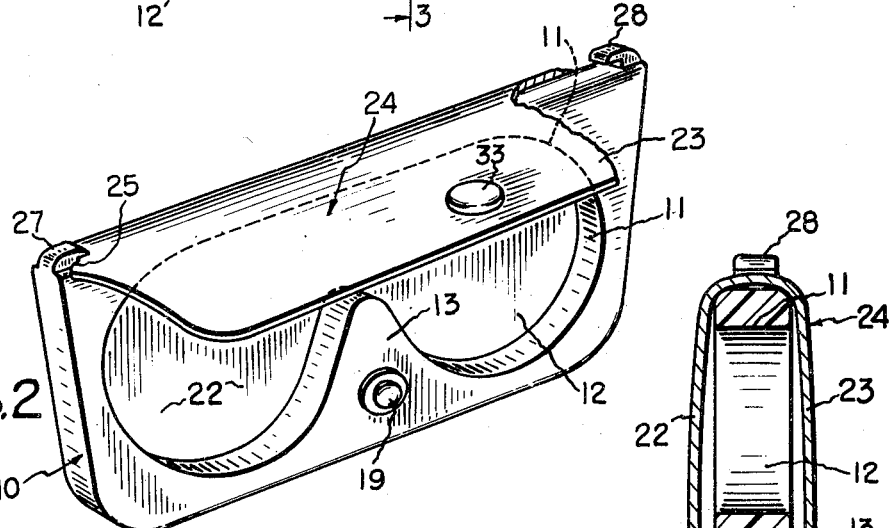
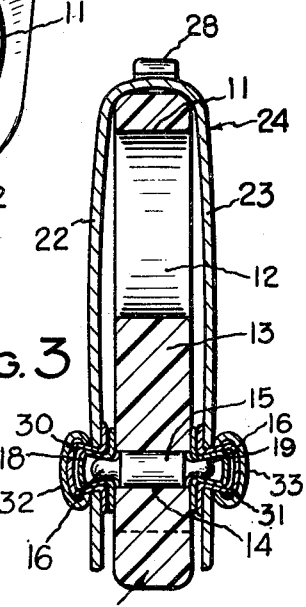
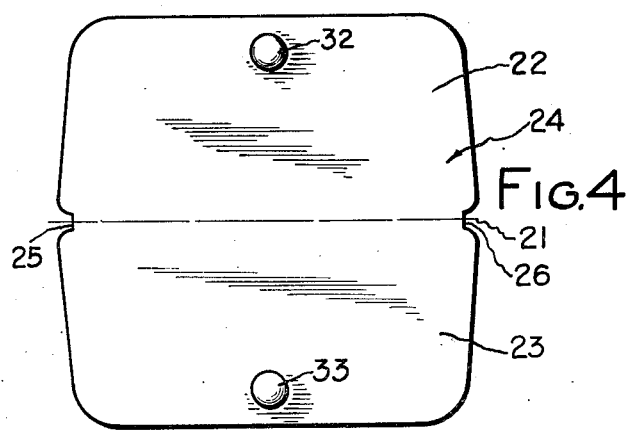
INVENTOR.
R. F. E. STEGEMAN
BY
ATTORNEY

2,710,091

SPECTACLE CASE

Raymond F. E. Stegeman, Greece, N. Y., assignor to Bausch & Lomb Optical Company, Rochester, N. Y., a corporation of New York Application October 23, 1953, Serial No. 387,835

3 Claims. (Cl. 206—5)

This invention relates to spectacle cases and more particularly it has reference to a specially constructed case for receiving a spectacle in nesting relation.

It is an object of this invention to provide a novel spectacle case that is inexpensive to manufacture and may be easily and quickly assembled.

Another object of this invention is to provide a spectacle case that may be opened from either side for ready access to the inside of the case.

A further object of this invention is to provide a spectacle case in which the peripheral sides serve as a supporting frame for the case.

These and other objects and advantages will be apparent in the details of construction and the arrangement and combination of parts by reference to the description given herebelow and the accompanying drawing in which:

Fig. 1 is a front view of my improved spectacle case, one portion being broken away and shown in section.

Fig. 2 is a perspective view of the spectacle case with a cover flap open and a portion thereof shown in section.

Fig. 3 is a sectional view taken on the line 3—3 of Fig. 1, and

Fig. 4 is a plan view of the cover member in spread-out position.

As shown in the drawing, the spectacle case embodying my invention comprises a substantially rectangular, flat, rigid, one-piece frame member 10 which has an opening 12 extending therethrough. A continuous wall portion 11 defines said opening 12 which is of such a size, shape and depth as to receive a spectacle in nesting relation. Said frame member 10 may be moulded out of plastic or may be formed by drilling out the central portion of a block of material of a rigid or semi-rigid type such a plastic, metal, hard rubber, or the like.

The central section of the bottom wall of the frame member 10 has an integrally formed bridge block 13 extending into the opening 12 in the frame. This bridge block 13 is so positioned and so shaped that it will support a pair of spectacles against lateral movement when the spectacle bridge and nose pads are nested thereon. The central section of the bottom wall of the frame 10, in proximity to the bridge block, has a hole 14 in which is secured an elongated plug 15 having a knob 16 on each end thereof to which are respectively attached the studs or fastening members 18, 19 projecting outwardly from opposite sides of the frame.

Folded along its medial line 21 to form two closure flaps 22 and 23 is a closure member or cover 24 having two notches or reentrant portions 25, 26 formed on said medial line along the side edges of said closure member 24. The notches 25, 26 are seated or engaged, respectively, under a pair of inwardly directed overhanging fingers or projections 27, 28 which are carried at the respective ends of the top edge of the frame member 10 and overhang part of said top edge. The closure member 24 may be formed of pliable or flexible material such as leather and may be lined with felt or other soft material to prevent scratching of the lenses of the spectacles. It is to be understood that other fastening means may be employed to hold the closure member to the frame within the scope of this invention.

The lower edge sections of the closure flaps have spring sockets or fastening members 30, 31 mounted therein which are adapted to coact, respectively, with the studs or fastening members 18, 19 on the bottom portion of the frame member. The spring sockets 30, 31 are mounted, respectively, on the closure flaps by means of buttons 32, 33.

The spectacle case is very easily assembled by simply flexing or bowing the closure member 24 so as to respectively position the notches 25 and 26 under the overhanging fingers 27 and 28. One or both of the closure flaps can be secured over the open sides of the frame by simply forcing the spring sockets 30, 31 of the closure flaps onto the studs 18, 19 in the frame member to form a closed spectacle case.

From the foregoing, it will be apparent that I am able to attain the objects of my invention and provide an improved and efficient spectacle case which can be easily manufactured at a minimum of expense. The frame member 10 could be moulded with the fastening studs 18 and 19 anchored thereto. Since the frame member 10 is slightly thicker than the spectacle to be enclosed, the latter is well protected against breakage. The bridge block 13 positions the spectacle and prevents endwise movement thereof. Various modifications can obviously be made without departing from the spirit of my invention as pointed out in the appended claims.

I claim:

1. A spectacle case comprising a substantially flat, rigid frame member having an opening extending therethrough, said opening having a continuous wall and being of a size and shape to receive a spectacle in nesting relation, overhanging projections carried at the respective ends of the top edge of the frame member, a closure member formed of pliable sheet material and extending downwardly from the top edge of the frame member on opposite sides thereof to cover both sides of the opening, said closure member having coacting portions positioned for engagement with the overhanging projections for holding the closure member on the frame member, and means for detachably securing the lower portions of the closure member to the lower portions of the frame member.

2. In a spectacle case the combination of a substantially rectangular, flat frame member having an opening which extends therethrough for receiving a spectacle in nesting relation, inwardly directed overhanging fingers carried at the respective ends of the top edge of the frame member, a pliable closure member folded along its medial line to form two closure flaps, said closure member having reentrant portions in its side edges at each end of said medial line, said reentrant portions engaging with the overhanging fingers on the frame member to secure the closure member to the frame member with the closure flaps covering opposite sides of the opening, studs projecting outwardly from the front and rear sides of the bottom of the frame member and spring sockets in each closure flap coacting with said studs to secure the flaps over the open sides of the frame member.

3. In a spectacle case the combination of a substantially rectangular, flat frame member having an opening extending therethrough to receive a spectacle in nesting relation, a bridge block formed integrally with one wall of the frame member and projecting inwardly into the opening in the frame member whereby the bridge of the spectacle may be positioned over the block, inwardly directed overhanging fingers carried at the respective ends of the top edge of the frame member, a pliable closure member folded along its medial line to form two closure flaps, said closure member having reentrant portions in its side edges at each end of said medial line, said reentrant portions engaging with the overhanging fingers on the frame member to secure the closure member to the frame member with the closure flaps covering opposite sides of the opening, studs projecting outwardly from the front and rear sides of the frame member in proximity to the bridge block and spring sockets in each closure flap coacting with said studs to secure the flaps over the open sides of the frame member.

References Cited in the file of this patent

UNITED STATES PATENTS

| | | |
|---|---|---|
| D. 170,343 | Stegeman | Sept. 1, 1953 |
| 636,416 | Phelps | Nov. 7, 1899 |
| 732,547 | Grooms | June 30, 1903 |
| 2,375,088 | Dorau | May 1, 1945 |
| 2,637,152 | Kraus | May 5, 1953 |